(12) United States Patent
Schneider et al.

(10) Patent No.: US 9,052,711 B2
(45) Date of Patent: Jun. 9, 2015

(54) METHOD FOR RECOGNISING SEQUENTIAL PATTERNS FOR A METHOD FOR FAULT MESSAGE PROCESSING

(75) Inventors: Nicolas Schneider, Toulouse (FR); Sylvie Delprat, Fonsorbes (FR)

(73) Assignee: EUROPEAN AERONAUTIC DEFENCE AND SPACE COMPANY EADS FRANCE, Paris (FR)

( * ) Notice: Subject to any disclaimer, the term of this patent is extended or adjusted under 35 U.S.C. 154(b) by 879 days.

(21) Appl. No.: 13/129,673

(22) PCT Filed: Nov. 16, 2009

(86) PCT No.: PCT/EP2009/065215
§ 371 (c)(1),
(2), (4) Date: Jul. 28, 2011

(87) PCT Pub. No.: WO2010/057846
PCT Pub. Date: May 27, 2010

(65) Prior Publication Data
US 2011/0276832 A1    Nov. 10, 2011

(30) Foreign Application Priority Data

Nov. 18, 2008   (FR) .................................... 08 57816

(51) Int. Cl.
*G05B 13/02* (2006.01)
*G05B 23/02* (2006.01)
(52) U.S. Cl.
CPC ........ *G05B 23/0229* (2013.01); *G05B 23/0262* (2013.01)
(58) Field of Classification Search
CPC ..... B60T 8/172; B60T 8/885; B60C 23/0408; B60C 23/061
See application file for complete search history.

(56) References Cited

U.S. PATENT DOCUMENTS

| | | | |
|---|---|---|---|
| 3,978,454 A * | 8/1976 | Willard .............................. 700/1 |
| 5,867,489 A * | 2/1999 | Hershey et al. ................ 370/324 |
| 2003/0080256 A1* | 5/2003 | Urnes et al. .................... 244/194 |
| 2005/0212523 A1* | 9/2005 | Chang et al. ................... 324/511 |

(Continued)

FOREIGN PATENT DOCUMENTS

EP    1 122 694 A2    8/2001

OTHER PUBLICATIONS

Sizu H. et al.: "Alarms Association Rules Based on Sequential Pattern Mining Algorithm", Fuzzy Systems and Knowledge Discovery 2008. FSKD'08. Fifth International Conference on, IEEE, Piscataway, NJ, USA, Oct. 18, 2008, pp. 556-560, XP031357607, ISBN: 978-0-7695-3305-6.

(Continued)

*Primary Examiner* — Ian Jen
(74) *Attorney, Agent, or Firm* — Young & Thompson

(57) ABSTRACT

A method for processing a sequence of fault messages occurring in a device including many systems, makes it possible to discriminate between fault messages most likely originating from a real system fault and fault messages without any real fault in the associated system (no fault found), characterized in that the method combines:
an "air-side" method (100) executed in real time for acquiring fault message data defining sequences stored in a fault database and for immediate diagnosis assistance using a diagnostics tool,
and a "ground-side" method (200) for the subsequent analysis of fault sequence data and for improving the diagnostics tool.

19 Claims, 3 Drawing Sheets

(56) References Cited

U.S. PATENT DOCUMENTS

| | | | |
|---|---|---|---|
| 2007/0022142 A1* | 1/2007 | Palmer et al. | 707/200 |
| 2007/0220381 A1* | 9/2007 | Huang et al. | 714/724 |
| 2007/0226570 A1* | 9/2007 | Zou et al. | 714/741 |
| 2007/0234163 A1* | 10/2007 | Mukherjee et al. | 714/736 |
| 2007/0234169 A1* | 10/2007 | Rajski et al. | 714/742 |
| 2008/0004768 A1* | 1/2008 | Chang et al. | 701/36 |
| 2008/0250284 A1* | 10/2008 | Guo et al. | 714/726 |
| 2010/0312420 A1* | 12/2010 | Sham et al. | 701/3 |

OTHER PUBLICATIONS

International Search Report, dated Jan. 8, 2010, from corresponding PCT application.

* cited by examiner

METHOD FOR RECOGNISING SEQUENTIAL PATTERNS FOR A METHOD FOR FAULT MESSAGE PROCESSING The present invention belongs to the field of the maintenance of complex systems, typically aeronautical. It relates more specifically to the field of equipment fault diagnosis. It concerns specifically the classification, analysis and filtering of fault messages and the reduction of false fault messages known as "no-fault-founds".

BACKGROUND OF THE INVENTION

It is clear that the continuous improvement in techniques and the search for ever greater efficiency have led to a continued increase in the quantity and complexity of embedded systems in current means of transport, particularly in aircraft. In parallel with the growth in these systems and components, and their respective operational control systems, the number of fault messages generated has risen accordingly. These numerous fault messages generated by the aircraft need to be interpreted so as to decide on the number and effectiveness of the maintenance actions required.

In fact, the many interdependencies between an aircraft's systems, and more generally of any complex real-time system, mean that an actual fault may generate a chain reaction of fault messages throughout the aircraft. These secondary fault messages, deriving from the primary cause of the incident, should not give rise to the maintenance actions normally associated with them because they do not reflect an actual fault in a component, but simply problems in this component's operating conditions as a result of a fault upstream.

If a faulty component is almost always identified, other non-faulty components may also be signaled and give rise to maintenance actions.

Many airlines have indicated that this issue of false fault messages (leading to no-fault-founds) was the most important of the problems for which a solution needed to be found. Indeed, unnecessary checks for parasitic faults result in long immobilizations of aircraft on the ground for maintenance, reducing their time daily flight time, and therefore the profitability of the airline's operations.

Many diagnostics tools have therefore been designed to overcome the problem of faults, whatever the field of activity.

One method quickly stands out from the others: the model-based approach. The principle consists of building the "model" of the systems to be diagnosed and detecting a fault by observing the differences between theoretical and actual input and output events. On this basis, calculations of interactions are carried out in order to target the element or elements in question as well as possible.

Subsequently, new approaches have emerged to refine and develop these model-based methods: hybrid systems. These hybrid systems have been refined by reasoning skills, such as case-based reasoning, Markov chains, etc. These approaches thus make it possible to diagnose systems whose behavior is not known or to handle intermittent fault detections, for instance.

A large proportion of these methods have in common the fact that it is assumed that the "models" of the systems, i.e. the complete logic of their sequences of faults, are known. They then rely on the observation of abnormal events in order to deduce a diagnosis.

In the present case of aeronautical systems comprising a large number of subsystems and components that are arranged in a limited space, whose correct functioning depends on temperature, vibration environment, electrical, chemical, etc parameters, and where a fault may cause local changes in these parameters, the system models are only partially known or formalized.

The initial abnormal event can only be observed through a series of maintenance messages whose causes and consequences are not always clearly identified. This greatly limits the applicability of the model-based approach to this problem of multiple aircraft system faults.

SUMMARY OF THE INVENTION

The present invention therefore seeks to improve the ability to diagnose and pin-point faults in a complex system whose model is not completely known, by increasing the effectiveness of the method of processing these fault messages so as to reduce unnecessary and costly maintenance actions as far as possible.

The objective is therefore to be able to identify these parasitic messages with sufficient confidence and expertise so that maintenance actions are not carried out.

Another aim is to increase the knowledge underlying the generation of fault messages so as to be able to analyze the interdependencies between systems and the chain reactions of messages, always with the aim of optimizing maintenance actions.

To this end, the invention envisages a method for processing at least one sequence of fault messages occurring in a device comprising many systems, which makes it possible to discriminate between fault messages most likely originating from a real system fault and fault messages without any real fault in the associated system (no fault found), characterized in that it combines:
an "on-board" method, executed in real time, for recording fault message data defining sequences stored in a fault database and for immediate diagnosis assistance using a diagnostics tool,
and a "ground-side" method for the subsequent analysis of fault sequence data and for improving the diagnostics tool used in the "on-board" method.

It is understood that separating the method of processing fault messages between an "on-board" method, executed in real time, and a "ground-side" method, with no time constraint, allows the use of advanced fault sequence analysis techniques, which would otherwise be unusable because of their computing constraints.

The "on-board" method filters the fault messages to keep only the actual faults.

The "ground-side" method analyzes the fault messages passed. This is a method of data mining, which analyzes the history in order to extract information from it. It analyzes "a priori" the passed fault messages of flights to build a model that will be used in the "on-board" method.

According to an advantageous implementation, the "ground-side" method comprises a step of analyzing fault messages using a technique of sequential pattern matching.

As explained, the separation into two analysis loops, "on-board" and "ground-side", allows the sequential pattern matching technique, which uses a lot of computing time, to be used.

Preferably, the "ground-side" method comprises a step of creating a database of sequential fault patterns, and in the sequential pattern matching step the following are calculated for each sequential pattern found:

a) its support: the number of times this sequential pattern appears in the database of sequential patterns found, b) the normalized value of the support for all patterns of the same size, c) a probability that corresponds to the probability value that the last element of the pattern is generated.

This arrangement allows a model to be created from the database of sequential fault patterns. This model can then be in the form of a weighted graph, a multiplicative or deterministic PLC, in the form of decision trees or Bayesian networks.

According to an advantageous implementation, the "ground-side" method comprises a step of constructing a model of parasitic fault messages, from the sequential patterns database, in the form of a deterministic finite-state PLC.

According to another implementation, allowing more processing of fault messages and evolution of the model by changing the weighting parameters, the "ground-side" method comprises a step of constructing a model of parasitic fault messages, from the sequential patterns database, in the form of a weighted deterministic graph representing the sequence of fault messages found.

The "ground-side" method uses, among its inputs, a knowledge model of the device's systems updated by the sequential pattern matching and a step of feedback from users to refine the sequential pattern matching.

According to a first implementation, the knowledge model is constructed on a rules-based architecture.

According to another implementation, the knowledge model is constructed on an architecture based on Bayesian networks.

Preferably, the "ground-side" method's knowledge model utilizes, among its data sources, the known interdependence between the device's systems, which explains cascading faults, and the feedback from maintenance crews.

This arrangement enhances the knowledge model and facilitates the extraction of sequential patterns from the fault message sequences. It is further understood that the knowledge model is not limited to these data sources, but that it may also use the knowledge of experts. However, the method is able to extract information. One of the big advantages of this approach is precisely that no prior knowledge of the analyzed systems is required.

According to a preferred implementation, the "ground-side" method comprises steps taking into account the knowledge model to:

have an effect on the sequential pattern matching by adding, deleting or changing patterns in the sequential patterns database.

have an effect on the classification of sequential fault patterns extracted by the sequential pattern matching algorithm.

influence the model created from the sequential patterns by adding, deleting or modifying statuses, links or weights of the graph.

Here, the model can be a weighted graph, or any other model chosen, depending on the type of messages to be processed or their complexity.

Advantageously, in the "on-board" real-time diagnostics support method, the diagnostics tool is a model in the form of an "air-side" graph copied from the weighted graph, making it possible to recognize, according to previously calculated thresholds, whether a fault pattern can be processed as plausible, ignored as likely to be a parasitic fault or put on hold as a case that is undetermined and awaiting more data.

It is understood that the thresholds can be set initially, or be deduced by statistical calculations, or learned on the basis of accumulated data. There is then a gradual learning process.

BRIEF DESCRIPTION OF THE DRAWINGS

The goals and advantages of the invention will be better understood in reading the description and drawings of a particular embodiment, given as a non-limiting example, for which the drawings show.

DETAILED DESCRIPTION OF THE PREFERRED EMBODIMENTS

Figure 1:
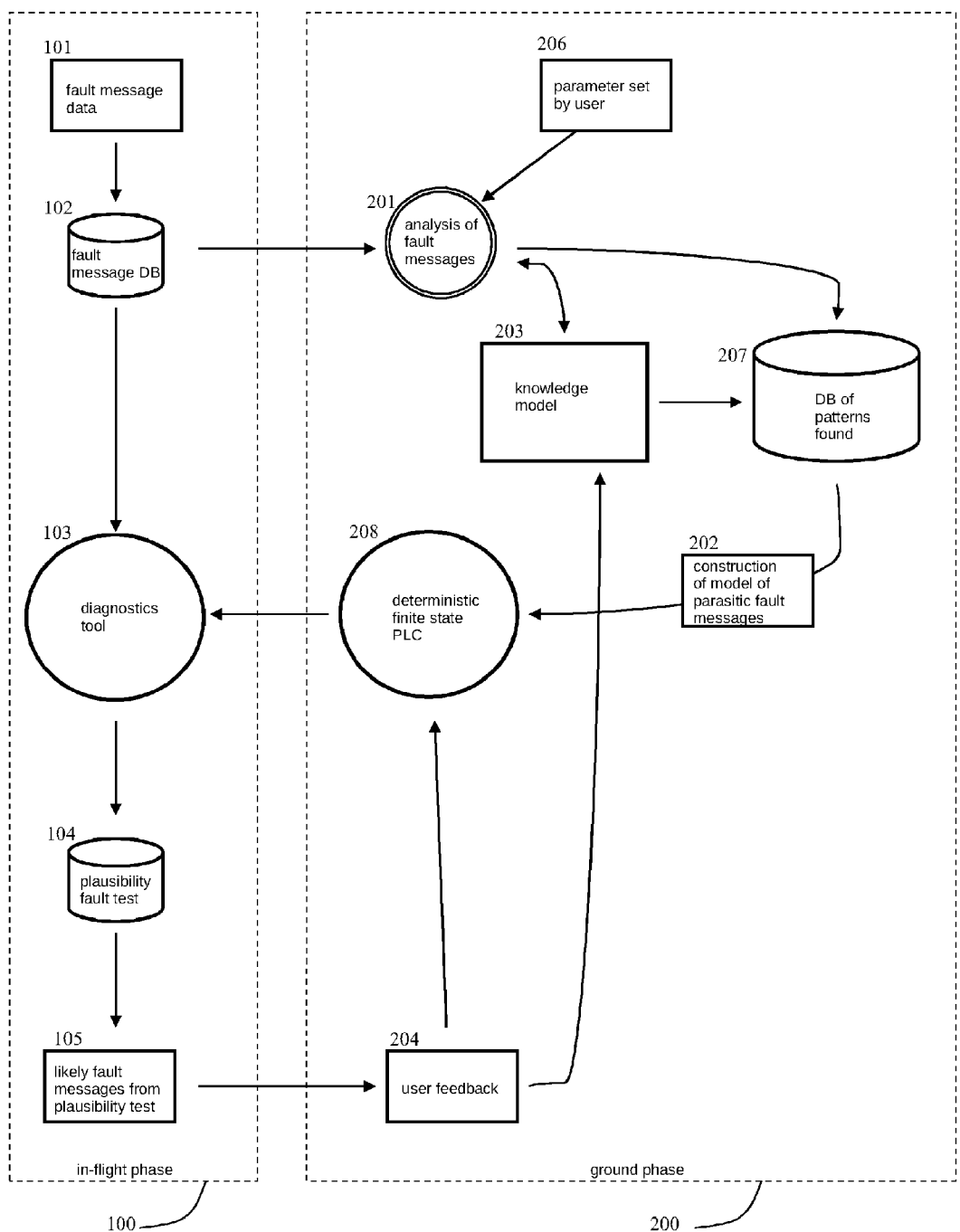
FIG. 1: a diagram of the steps of the method according to the invention, representing the scenario of off-loading fault messages through to the deletion of parasitic messages and the selection of maintenance actions

The method according to the invention is intended to be implemented by means of a first software program executed by a computer 35 on board an airplane 30 for real-time fault message analysis, then next by a second software program executed by a "ground-side" computer 40 (or, alternatively, the same as the above-mentioned on-board computer 30) for subsequent analysis, typically after the flight that generated fault messages, for example during maintenance of the aircraft following these fault messages.

It is clear that this is a closed loop system and that, before the method is first used in flight, a model (graph, PLC, tree, database, etc.) is constructed on the ground. This model is then inserted into the "on-board" computer 35 that will process the data in real time.

In the "air-side" portion, the purpose of this method is to filter fault messages in real-time. It is also used by technician software between some flights.

The computer 35 on board the aircraft 30 is of a known type. In this non-limiting example, and most often in practice, it already exists on the airplane 30. It receives fault message data from aircraft systems 45 in real time through a network, also known and preexisting.

This computer 35 has sufficient processing power to implement the algorithm of the real-time portion of the method according to the invention and also sufficient memory space for, firstly, storing at least part of the software corresponding to the method according to the invention and, secondly, storing all the calculation parameters and the detailed history of the fault messages received, with a view to their subsequent analysis on the ground by a second software program. This computer 35 also has a known type of data loading interface allowing the software to be updated regularly.

This computer 35 also comprises a screen type of visual interface, possibly touch, for showing relevant information.

Similarly, the "ground-side" computer 40 is of a known type, for example a PC. The "ground-side" computer 40 has sufficient processing power to implement the algorithm of the "ground-side" portion of the method according to the invention and sufficient memory space for, firstly, storing at least part of the software corresponding to the method according to the invention and, secondly, storing all the calculation parameters and the detailed history of the fault messages received.

The "ground-side" computer 40 also has a known type of data loading interface for retrieving the data from the "on-board" computer, and for saving the analysis results and the new parameters of the in-flight software with a view to updating the software on the "on-board" computer 35.

To summarize, during a flight of the aircraft 30 equipped to implement the method according to the invention, the "on-board" computer 35 is possibly faced by one or a series of fault messages. This series of fault messages is processed in real time by software implementing the method, which extracts the most probable actual faults from it, and eliminates the faults it considers likely to be indirect. The maintenance team will make decisions based on these most probable actual faults.

Then, after the airplane 30 has landed, a subsequent analysis of the data, and the confirmation or refutation by the maintenance technicians of the veracity of the alleged fault allows the diagnosis software's parameters to be modified. Above all, it makes it possible to process only the actual faults, to reduce the costs of unnecessary tests and unneeded removals of equipment at the equipment manufacturers.

As illustrated in FIG. 1, the method according to the invention thus combines:

an "air-side" method 100, executed in real time (the "air-side" method is therefore also called "short loop" in that it provides an almost immediate response to the crew and maintenance teams confronted with a set of fault signals) to acquire data and assist in providing immediate diagnostics, and a "ground-side" method 200 of analyzing data subsequently and improving the diagnostics tool (this method is also called "long loop" in the rest of the description).

The overall method uses a new series of algorithms known per se in other applications (consumer habits, web browsing) for handling the problem of false fault messages appearing in complex real-time systems such as aircraft.

In the description that follows, the "ground-side" method 200 is presented first.

Figure 3:
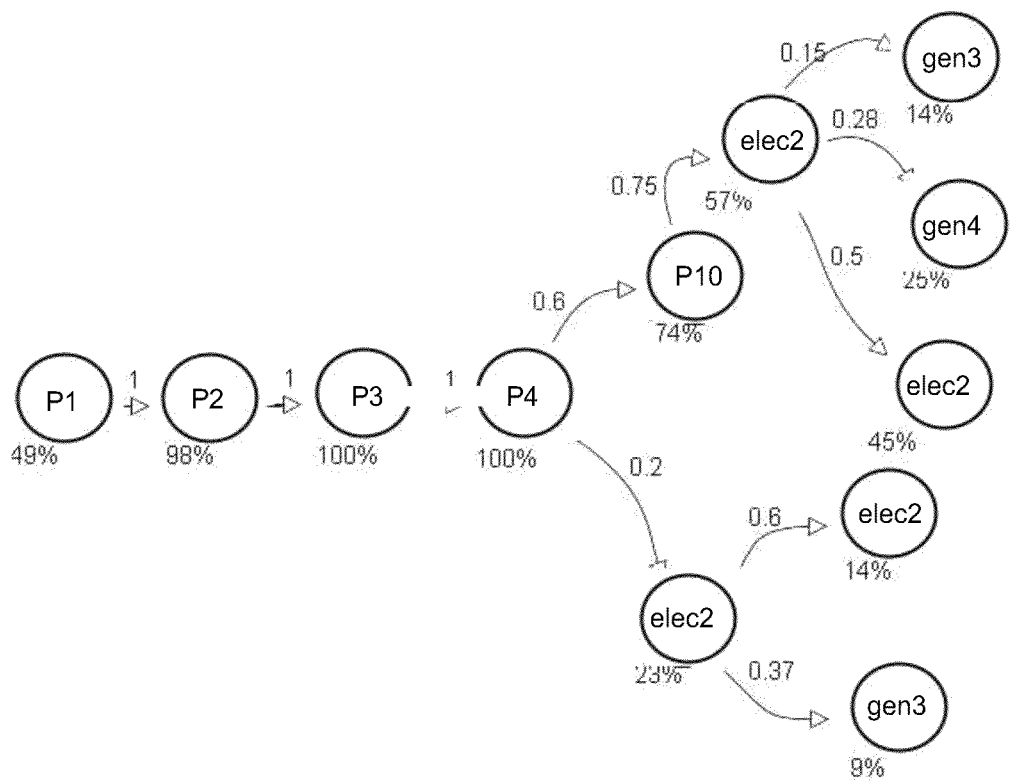
FIG. 3: an example of a weighted graph constructed from sequential pattern matching.
Figure 4:
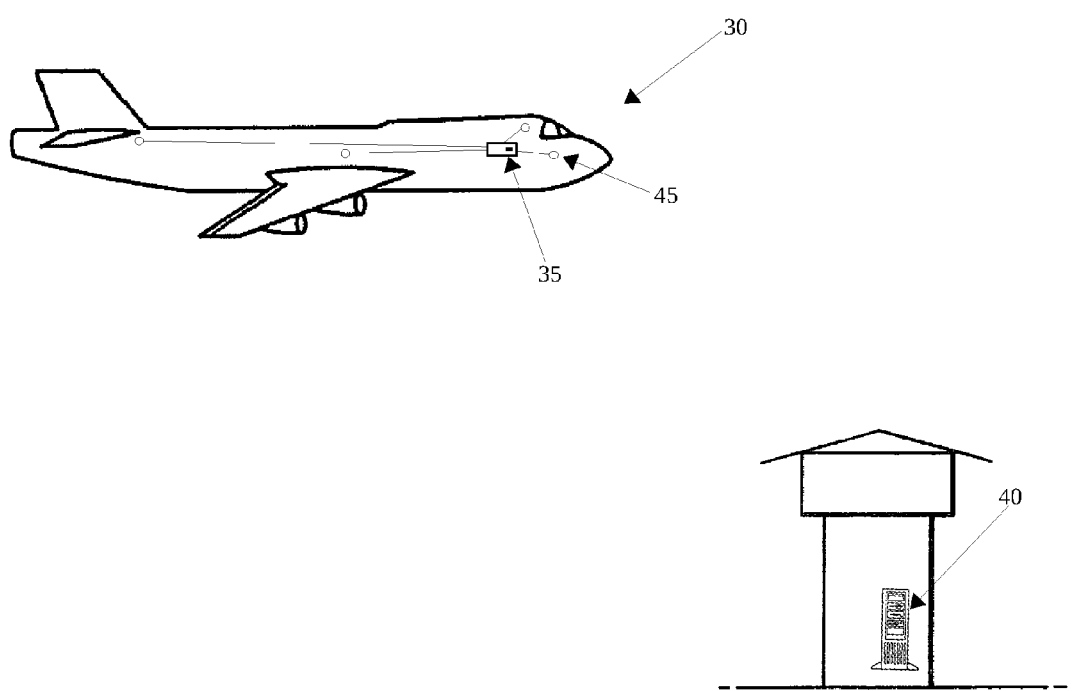
FIG. 4: a schematic illustration of arrangement of an air-side computer and systems on-board an aircraft, and a ground-side computer, in accordance with an embodiment of the invention.

The "ground-side" method 200 comprises a step 201 of analyzing fault messages by a technique, known per se, of sequential pattern matching. Secondly, the "ground-side" method 200 comprises a step 202 of constructing a model of parasitic fault messages, for example in the form of a weighted graph 208, also of a known type (and for example shown in FIG. 3).

This "ground-side" method 200 uses as input a partial knowledge model 203 of the aircraft systems, initially constructed by the designers of the aircraft, and updated by the sequential pattern matching 201 and the feedback 204 from maintenance actions.

The "knowledge model" 203 allows the partial knowledge about the aircraft systems and the generation of fault messages to be utilized and stored in an incremental way.

The "feedback" 204 allows the system to evolve automatically and be able to check the relevance of results (e.g. did such-and-such a fault or fault pattern really require a maintenance procedure?).

Sequential pattern matching 201 is at the heart of the "ground-side" method 200 of analysis.

Indeed, as fault messages are generated one after another on a flight of an aircraft having an abnormality, specific patterns of series of these fault messages can emerge as occurring more frequently, and the goal is to identify them. This is precisely the goal of the known techniques of sequential pattern matching.

It is noted here that the sequential pattern matching technique allows correlations to be discovered between series of events according to the chronology of their appearance. This involves determining which sub-sequences of events occur most frequently within a given set of sequences.

Such techniques are used, for example, for analyzing consumer behavior or predicting malicious acts, for analyzing weather data or for analyzing stock market data. It is known that extracting long patterns is complex and requires powerful computing resources.

It is noted here that a clear difference appears between the "ground-side" method 200 and the "air-side" method 100, since in the "air-side" method the fault messages continue to occur even when the analysis is in progress, which may alter the diagnosis and thus make sequential pattern matching difficult in real time.

In contrast, in the "ground-side" method 200 the complete series of fault messages is known and can be analyzed all together, with no computing time constraint.

For this, the sequential pattern matching 201 uses an algorithm constructed on the basis of several algorithms from reference material, able to respond in the most pertinent way possible to the specific needs and constraints, namely:

Managing a large database of fault messages, whose size is related to the number of aircraft systems, subsystems and components.

Number of fault messages generated at the same time.

Inability to prune the matching without running the risk of deleting a fault message that is relevant or that originates from a real fault.

Ability to determine whether a pattern is relevant.

Ability to manage time and system constraints.

Using a method that is not a "black box", so as to be able to reuse the results for constructing the model.

These constraints and requirements related to the aviation industry have thus led the sequential pattern matching step 201 of this method using various techniques, in particular:

1/The sequential pattern matching engine used in this example is based on an algorithm known as Spade (Sequential Patterns Discovery using Equivalent Class), developed by Zaki in 2001.

2/CloSpan (Closed Sequential Pattern Mining, by Yan, Han and Afshar 2003) is another known algorithm allowing the sequential pattern matching and retrieval to be optimized, and used here in addition to Spade.

3/Incremental: a technique known to experts (e.g. Cheung, CESI 96 or by Zhang, Kao 2002) that uses knowledge extracted at level n−1 for extracting sequential patterns at level n+1.

4/Interactive Sequence Mining: a technique also known (e.g. Parthasarathy, Zaki CIKM 99), which uses the general knowledge of the knowledge model 203 to construct the sequential patterns at level n+1, but which requires large memory and computing time resources.

5/Constraints: taking into account constraints such as minimum or maximum time between two successive messages, a time window during which messages are considered to be generated simultaneously. Pattern length constraints or constraints on certain attributes are also taken into account.

The sequential pattern matching 201 uses a parameter set 206 that the user must supply:

The attribute representing a transaction

The attribute representing time

List of constraints on the attributes

Time constraints (e.g. maximum time window for a sequence, maximum or minimum time interval between two events)

Maximum length of sequential patterns (limit to number of events considered in a pattern)

Minimum support of sequential patterns (minimum frequency to be considered a sequential pattern)

The purpose of these parameters is to facilitate the matching and to reduce the computing time significantly.

This parameter set 206 makes it possible to adjust to the inherent constraints in an application case and is valid throughout the scenario (unlike the knowledge model 203, which can interact more dynamically with the system).

Ultimately, the sequential pattern matching 201 generates a database 207, which no longer contains fault messages, but fault patterns; this is a fundamental difference in approach.

The aim of the knowledge model 203 is to make the algorithm of sequential pattern matching 201 more relevant and to guide the creation and updating of the graph 208 that results from this.

This knowledge model 203 uses the following as data sources: the knowledge of experts (the aircraft's designers and specialists in the causes of sequential patterns of aircraft faults); the known interdependence between the aircraft systems, which explains cascading faults; and the feedback 204 from maintenance teams, in order to construct and evolve its knowledge.

The knowledge model 203 can have a direct effect on the sequential pattern matching 201 by adding, deleting or changing patterns in the sequential patterns database 207. It also has an action of classifying fault messages (actual, non-relevant or others depending on the context and scope); in effect, because of its knowledge of systems and feedback it can, eventually, classify the sequential patterns extracted by the sequential pattern matching algorithm 201 and stored in the sequential patterns database 207.

Finally, the knowledge model 203 can influence the graph 208 (or any other model used) created from sequential patterns by adding, deleting or modifying statuses, links or weights of the graph.

This knowledge model 203 thus serves to capitalize on the known and extracted knowledge. It can be modeled in multiple ways, depending on the application case.

Depending on the complexity of the system under consideration and the depth of knowledge to be modeled, the knowledge model 203 is constructed on a rules-based architecture for relatively less complex systems, or on a more complex architecture such as Bayesian networks, which is the preferred approach here.

It is noted that Bayesian networks are both models for representing knowledge and means of calculating conditional probabilities. In such a network, the relationships of rules (causal relationships) are probabilistic rather than deterministic.

These two approaches to knowledge models are of a known type and are not described in detail here.

The common point remains the fact that this knowledge model 203 is initialized by the knowledge of experts and that it evolves with the extracted data and knowledge derived from the feedback 204 and the sequential pattern matching 201.

With regard to the construction of the graph 208, the sequential pattern matching algorithm 201 is designed so that it is possible to derive a weighted graph 208 from it. In effect, several calculations are integrated into the execution of the sequential pattern matching algorithm 201 that allow a graph to be constructed subsequently.

More specifically, the following are calculated for each sequential pattern found:

a) its support: the number of times this sequential pattern appears in the database of sequential patterns 207, b) the normalized value of the support for all patterns of the same size. This value is between 1 and 100 c) a probability that corresponds to the probability value that the last element of the pattern is generated.

Figure 2:
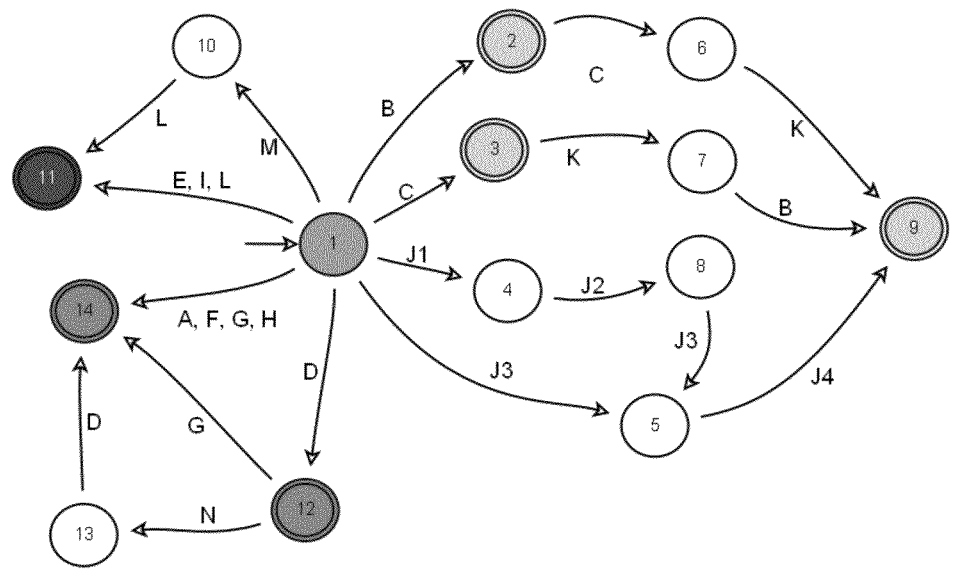
FIG. 2: An example of a simple PLC after sequential pattern matching for three separate classifications starting from a beginning state (1): "actual fault" (11), "non-relevant fault" (2, 3, 9), "undetermined" (12, 14)

Several choices are then available depending on the context and the application case:

If only the sequence of the fault messages is a relevant item of information, a deterministic finite-state PLC is constructed from these values (for example, as shown in FIG. 2). It is noted that a deterministic finite-state PLC comprises a finite set of distinct statuses, which it passes between along existing transitions between these statuses; this shift from status to status being achieved by reading each letter of a word supplied on input, here a sequential pattern of fault messages.

Otherwise, and as is the preferred case in this example, a deterministic weighted graph 208 of known type is constructed with these values, representing the sequence of the selected fault messages, and this graph is copied and loaded into the memory of the "air-side" computer 35 in the form of an "air-side" graph 103.

It can therefore be directly inferred (i.e. on the basis of observed faults, probabilistic conclusions can be drawn of actual faults and faults that are indirect, and thus not actual, or even not yet observed) from the "air-side" graph 103 as fault messages are generated in the airplane 30.

Similarly, a confidence value concerning the pattern's classification (for example: What is the degree of non-relevance of the pattern?) can be given at any time, which means a decision about maintenance work can be justified, the general behavior of the messages being generated can be predicted (for example: what is the most likely branch?) or missing or incorrect messages can be taken into account by allowing the use of negative weights in the "air-side" graph 103.

The "air-side" method 100 of support for the real-time diagnostics ("short loop") uses the model in the form of an "air-side" graph 103 for processing fault messages 101 generated in real time by the aircraft. These fault messages 101 are stored in a database 102 in conjunction with time data and other parameters intended to characterize the messages, with a view to their subsequent recovery by the "ground-side" method 200.

The "air-side" graph 103 then makes it possible to recognize whether parasitic fault messages are present and remove them if necessary.

The "air-side" graph 103 may, for example, classify a series of fault messages 101 generated by the aircraft as being non-relevant, with a 60% probability (a sequence of messages 101 generated by the aircraft can be recognized, with a 60% probability, as a sequential pattern identified as "no fault found" in the sequential patterns database 207).

In a step 104, according to the thresholds set by the user (maintenance team) and stored in the "air-side" computer 35, a fault pattern 101 may be processed as plausible, ignored as likely to be a parasitic fault, or put on hold as a case that is undetermined and awaiting more data.

In the case where a fault pattern 101 is classified as "non-relevant" with a 100% probability, it will be directly filtered in order not to be taken into account in the choice of maintenance action.

At the end of fault message processing 101 by the "air-side" method 100, only the messages 105 most likely originating from a real fault in an aircraft system remain, which the method has therefore distinguished from fault messages without any real fault in the associated system (no fault found).

The feedback 204 makes it possible to ensure that the results found by the "ground-side" method 200 and modeled in the weighted graph 208 correspond well with their actual application in the context of the "air-side" method 100, in the form of correctly predicted real and false faults.

If this is not the case, then the data from maintenance operations are used to update the weighted graph 208 by modifying certain statuses, links or weights in the graph, in a way that is known and not detailed here.

If a new fault is found then the feedback 204 adds the event in the graph 208 (if the sequential pattern matching 201 has not done so before).

This feedback 204 is very important because, besides making sure that the results are consistent, it creates a feedback loop that allows the entire method to improve itself.

The method as a whole, once implemented, forms a continuous learning cycle, enabling it to adapt to new situations and refine its filtering and analysis of fault messages based on the data actually observed and the feedback 204.

The method for fault message processing according to the invention presents several advantages. It could be used by many aircraft and helicopter manufacturers to improve their analysis and understanding of the generation of fault messages and improve the diagnostics and pin-pointing of faults.

This process would allow them to reduce the display by the support systems to the maintenance and processing of parasitic faults by the maintenance teams, and thus avoid unnecessary and costly maintenance actions that lead to significant time being wasted (particularly during the turnaround of aircraft on the ground). It also makes it possible to provide information about the confidence, probability and relevance of fault messages and to be able to target the necessary maintenance actions with greater certainty and speed.

The main innovation of this method, and thus one of the main advantages over other approaches, is to provide a system that fully utilizes the feedback and general knowledge about aircraft systems and their faults. The system adapts to new failures and improves automatically as faults appear and knowledge evolves.

Moreover, this approach makes it possible to have an explicit model of the triggering of faults and the generation of associated messages, in the form of a easily analyzable graph, which can also provide avenues for improvement when systems as designed for a new device.

The knowledge model is specific to each aircraft family, and takes the fault history into account.

The scope of this invention is not limited to the details of the embodiments considered above as an example, but on the contrary extends to modifications within the reach of the expert.

In the description a deterministic weighted graph, or a deterministic PLC, was used as model 208. It should be noted that this method is not limited to these two types of models for representing the sequencing of faults. Many other models can be considered depending on the type of messages to be processed and their complexity.

The invention claimed is:

1. A method for processing at least one sequence of fault messages occurring in an aircraft with on-board systems connected to an on-board aircraft computer, each said system being able to send fault messages to the on-board aircraft computer to characterize a faulty state of said system, in order to discriminate between fault messages originating from an actual system fault and false fault messages where fault in an associated system is not found, comprising:
    in a preliminary phase, constructing a model constituting a diagnostics tool useable by the on-board aircraft computer,
    in an in-flight phase, at the on-board aircraft computer, executable in real time during flight of the aircraft,
        recording fault message data from one or more fault messages received by said on-board aircraft computer from said on-board systems in a fault database connected to said on-board aircraft computer, and
        analyzing the one or more fault messages using the diagnostics tool to determine which of the one or more fault messages is an actual system fault, and
    in a ground phase subsequent to the in-flight phase,
        at a computer, analyzing the fault message data recorded in the fault database during the in-flight phase, and
        at the computer, updating the diagnostics tool to improve performance of the diagnostics tool for use in a subsequent in-flight phase.

2. The method according to claim 1, wherein, during the ground phase, the fault messages of the fault message data are analyzed using a technique of sequential pattern matching.

3. The method according to claim 2,
    wherein the ground phase further comprises a step of creating a database of sequential fault patterns found by way of said sequential pattern matching of said analyzing step, and
    wherein the following are calculated for each sequential fault pattern found:
        a number of times the sequential fault pattern appears in the database of sequential patterns,
        a normalized value of support for all sequential fault patterns of a same size, and
        a probability that corresponds to a probability value that a last element of the sequential fault pattern is generated.

4. The method according to claim 3, wherein the ground phase further comprises a step of constructing a model of parasitic fault messages, from the sequential patterns database, in the form of a deterministic finite-state PLC.

5. The method according to claim 3, wherein the ground phase further comprises a step of constructing a model of parasitic fault messages, from the sequential patterns database, in the form of a weighted deterministic graph representing a sequence of fault messages found.

6. The method according to claim 5, wherein the ground phase uses, as inputs, a knowledge model of the systems updated by the sequential pattern matching and feedback from users.

7. The method according to claim 6, wherein the knowledge model is constructed on a rules-based architecture.

8. The method according to claim 6, wherein the knowledge model is constructed on an architecture based on Bayesian networks.

9. The method according to claim 6, wherein the knowledge model utilizes, as data sources, known interdependence between the systems for explaining cascading faults, and feedback from maintenance crews.

10. The method according to claim 6, wherein the ground phase further comprises using the knowledge model, to:
    any of add, delete, or change patterns in the sequential patterns database;
    change a classification of sequential fault patterns extracted by the sequential pattern matching; and
    any of add, delete, or modify statuses, links or weights of the weighted deterministic graph.

11. The method according to claim 5, wherein, in a subsequent in-flight phase, the diagnostics tool is a model in the form of a graph copied from the weighted deterministic graph, said graph being used to classify whether any one fault pattern derived from fault messages received from the on-board systems is one of:

to be processed as plausible, to be ignored as likely to be a parasitic fault, or to be put on hold as a case that is undetermined and awaiting more data, according to previously calculated thresholds.

12. The method according to claim 2, wherein the ground phase uses, as inputs, a knowledge model of the systems updated by the sequential pattern matching and feedback from users.

13. A method for processing at least one sequence of fault messages generated by on-board systems of an aircraft and received by an on-board aircraft computer, comprising:

in a preliminary phase, constructing a model constituting a diagnostics tool useable by the on-board aircraft computer using, as input, at least a partial knowledge model of interdependences between the on-board systems of the aircraft, in an in-flight phase, executing at the on-board aircraft computer in real time, the sub-steps of:

recording, in a fault database connected to said on-board aircraft computer, fault message data from one or more fault messages received by said on-board aircraft computer from one or more of said on-board systems, using the diagnostics tool to perform an analysis on the one or more fault messages as one or more fault patterns, and for each of the one or more fault patterns determining from said analysis whether the one or more fault patterns corresponds to a false fault pattern eligible for filtering or corresponds to an actual fault requiring attention, and processing any fault pattern determined as an actual fault;

in a ground phase subsequent to the in-flight phase, at a computer, analyzing the fault message data that was recorded in the fault database during the in-flight phase to produce a model of parasitic fault messages, and at the computer, using the model of parasitic fault messages as input to produce an updated diagnostics tool for use in a subsequent in-flight phase, wherein in the ground phase, at the computer, the fault message data is analyzed by performing sequential pattern matching on the fault message data and storing an output of the sequential pattern matching as sequential fault patterns in a sequential patterns database, said sequential fault patterns being used to produce the model of parasitic fault messages, and wherein the following are calculated for each sequential fault pattern found:

a number of times the sequential fault pattern appears in the database of sequential patterns, a normalized value of support for all sequential fault patterns of a same size, and a probability that corresponds to a probability value that a last element of the sequential fault pattern is generated.

14. The method according to claim 13, wherein in the ground phase, at the computer, a knowledge model is constructed from the partial knowledge model, and updated by output from the sequential pattern matching.

15. The method according to claim 14, wherein in the ground phase, at the computer, the knowledge model is further updated by way of feedback from maintenance teams.

16. The method according to claim 14, wherein the ground phase further comprises the step of, at the computer, using the knowledge model to change the contents of the sequential patterns database prior to using to produce the model of parasitic fault messages.

17. The method according to claim 14, wherein the ground phase further comprises the step of, at the computer, using the knowledge model to classify one or more sequential patterns stored in the sequential patterns database as one of pertaining to actual faults in a corresponding system.

18. The method according to claim 14, wherein the model of parasitic fault messages is in the form of a weighted graph, and wherein the ground phase further comprises the step of, at the computer, using the knowledge model to change and or statuses, links or weights of the weighted graph.

19. The method according to claim 13, further comprising:

in a subsequent in-flight phase, using, at the on-board aircraft computer in real time, the updated diagnostics tool as the diagnostics tool.

* * * * *